Aug. 17, 1948.                    G. A. LYON                        2,447,415
                    PLASTIC FORMING APPARATUS AND METHOD
Filed July 5, 1944                                            4 Sheets-Sheet 1
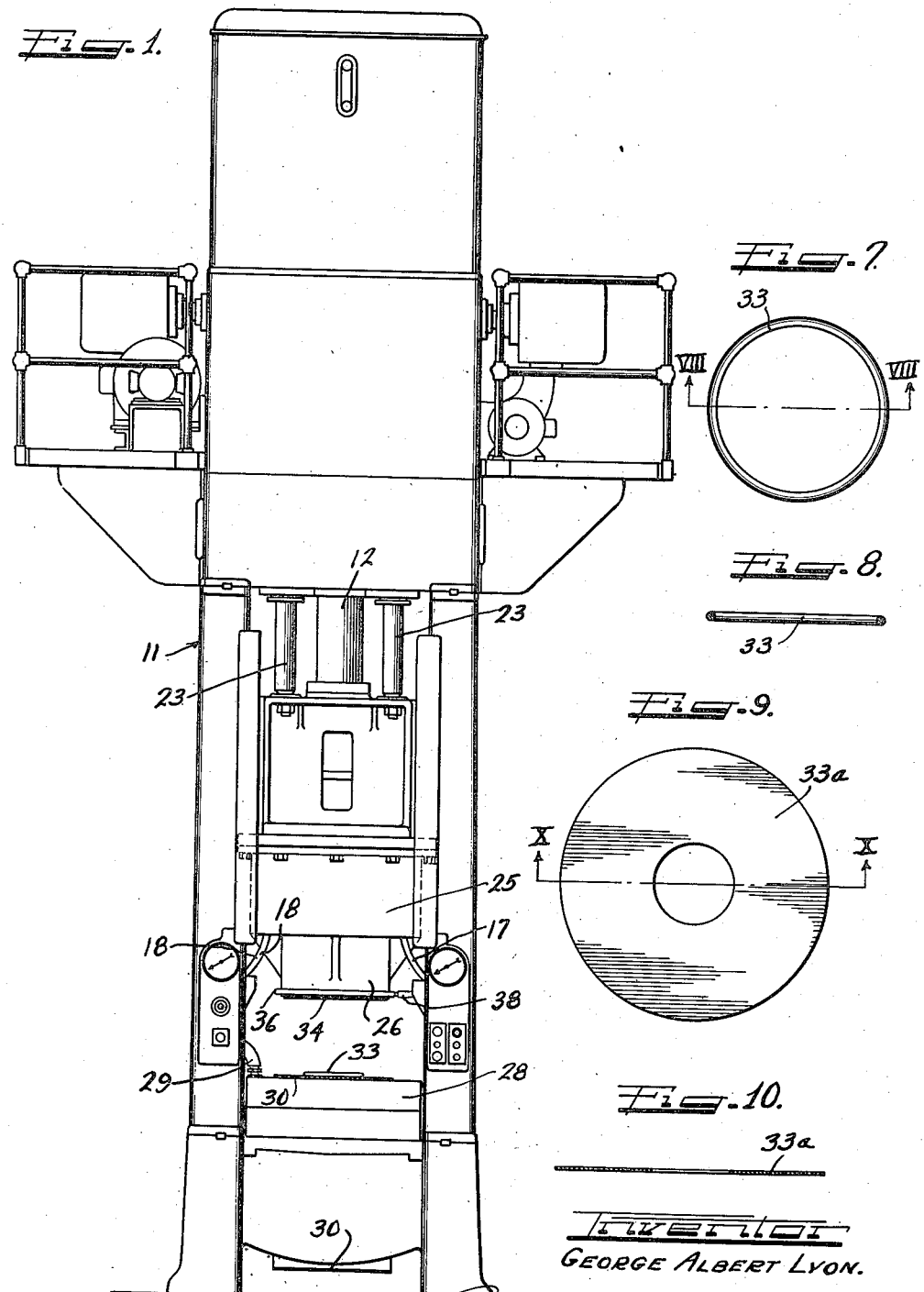
Inventor
GEORGE ALBERT LYON.

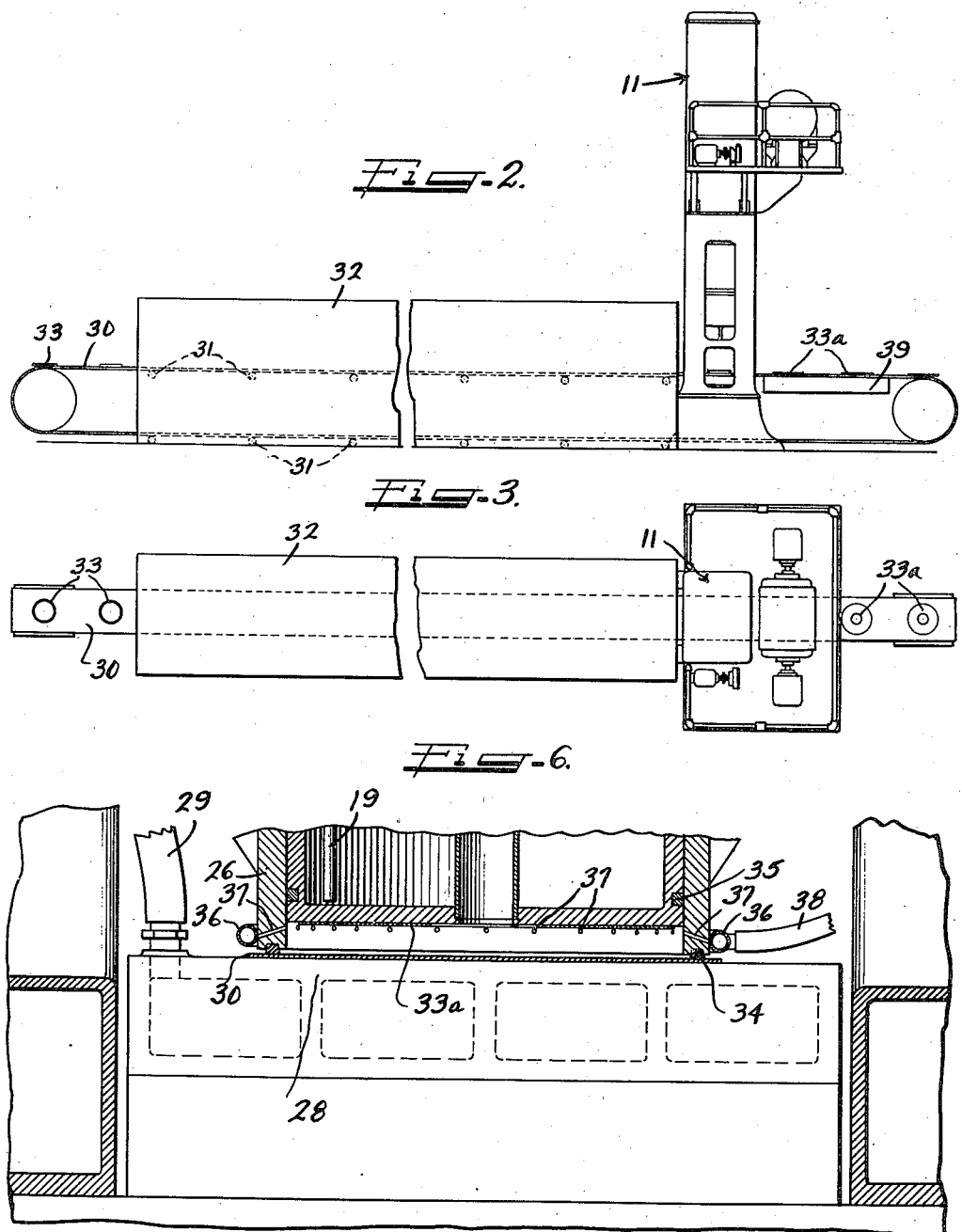

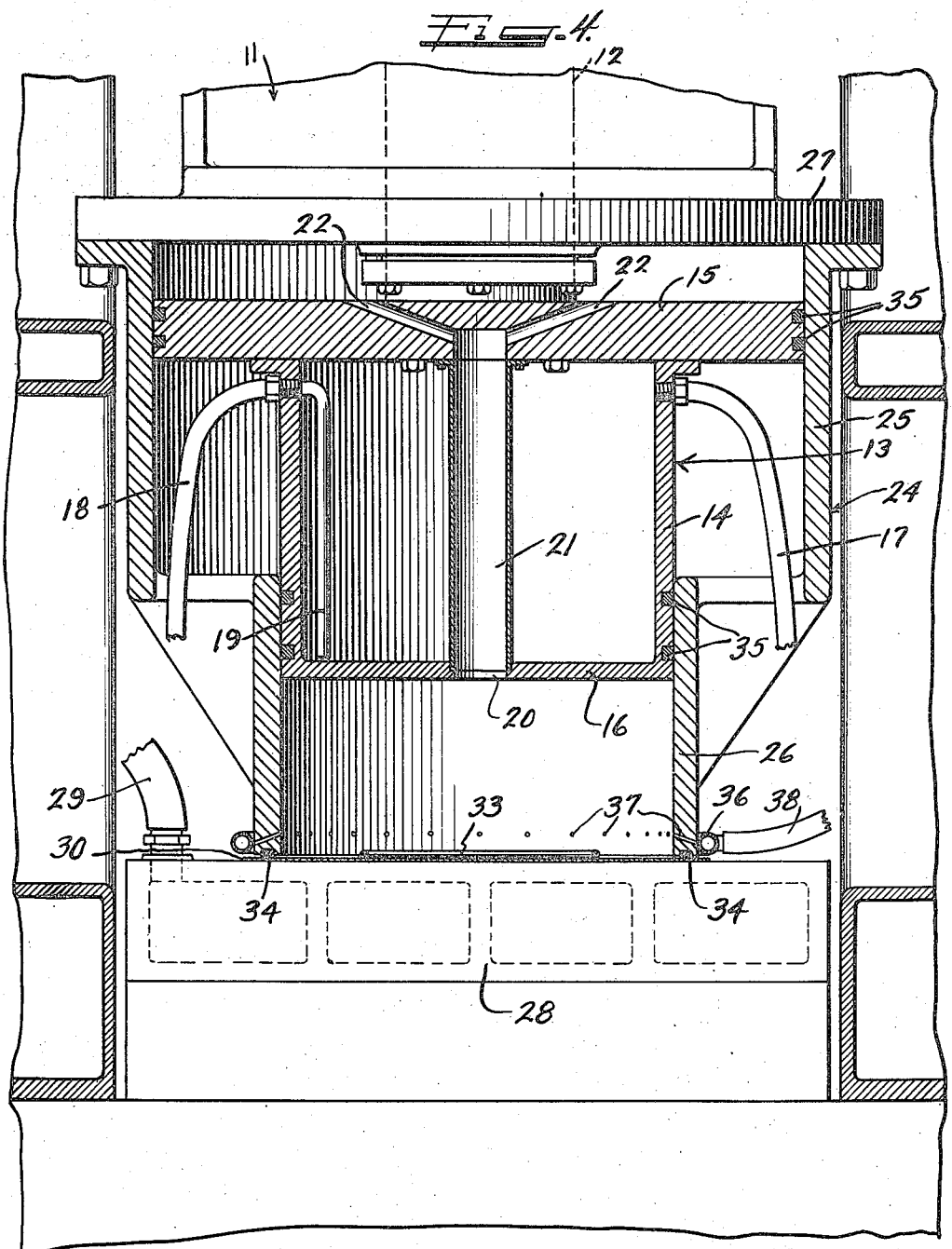

Aug. 17, 1948.     G. A. LYON     2,447,415
PLASTIC FORMING APPARATUS AND METHOD
Filed July 5, 1944     4 Sheets-Sheet 4

Inventor
GEORGE ALBERT LYON.
by Charles H. Hill
Attys.

Patented Aug. 17, 1948

2,447,415

UNITED STATES PATENT OFFICE 2,447,415

PLASTIC FORMING APPARATUS AND METHOD

George Albert Lyon, Allenhurst, N. J.

Application July 5, 1944, Serial No. 543,525

17 Claims. (Cl. 18—17)

1

This invention relates to an apparatus and method for forming plastic material into sheets, and more particularly to a method and apparatus for pressing plastic material into sheets or blanks.

In forming plastic material into sheets, it is important to avoid the formation of air bubbles in the sheets, which bubbles result from the entrapment of air in the plastic material. Furthermore, it is desirable to form the sheets with smooth, polished surfaces so that the finished product may have a pleasing appearance and be easily cleaned without requiring a separate polishing step.

The invention contemplates the pressing of plastic into sheets in a rarefied atmosphere and between highly polished surfaces, so that sheets produced by this apparatus and method will be substantially free of air bubbles and have smooth, polished surfaces.

It is an object of this invention to provide an apparatus for forming plastic material into sheets in a rarefied atmosphere.

Another object of this invention is the provision of apparatus for pressing plastic material into sheets which includes means for removing freshly formed sheets from the face of the pressing element without marring the sheets.

A further object of this invention is the provision of integrated apparatus for heating plastic material, pressing it into substantially flawless and polished sheets, and carrying the material through the heating and pressing means without necessitating manual handling of the material.

Still another object of this invention is the provision, in apparatus for pressing plastic material into sheets, of a conveyor which provides one of a pair of smooth, highly polished pressing surfaces to impart a smooth, polished surface to the sheets pressed from the material.

It is also an object of this invention to provide a method of pressing plastic materials into sheets in which the pressing operation is carried out in a rarefied atmosphere to avoid defects in the pressed sheets caused by entrapped air.

Another object of this invention is to provide a method of forming sheets from plastic material which includes heating the material, pressing the material in a rarefied atmosphere and between highly polished surfaces, and removing the pressed sheets from the pressing element by directing a fluid blast between the adhering faces of the pressing element and the sheets.

A further object of the invention is to provide a method of pressing plastic material into sheets

2 which includes pressing the material between a pressing element and a conveyor for the material to avoid unnecessary handling of the material.

Other and further objects and advantages of the invention will be apparent to those skilled in the art from the following description and the appended claims.

In the drawings:

Figure 1 is a front elevational view of the press forming part of the apparatus, with a mass of plastic material in position to be pressed;

Figure 2 is a broken side elevational view of the apparatus of this invention;

Figure 3 is a broken plan view of the apparatus;

Figure 4 is a sectional view of the pressing parts of the apparatus with one element enclosing the plastic material;

Figure 6 is a view of a portion of Figure 5 with the movable pressing element in a partially retracted position;

Figure 7 is a plan view of a ring of plastic material to be pressed into sheet form;

Figure 8 is a cross-sectional view taken on the line VIII—VIII of Figure 7;

Figure 9 is a plan view of a plastic sheet produced from the plastic ring of Figure 7; and Figure 10 is a cross-sectional view of the sheet shown in Figure 9, taken on the line X—X of that figure.

Figure 5:
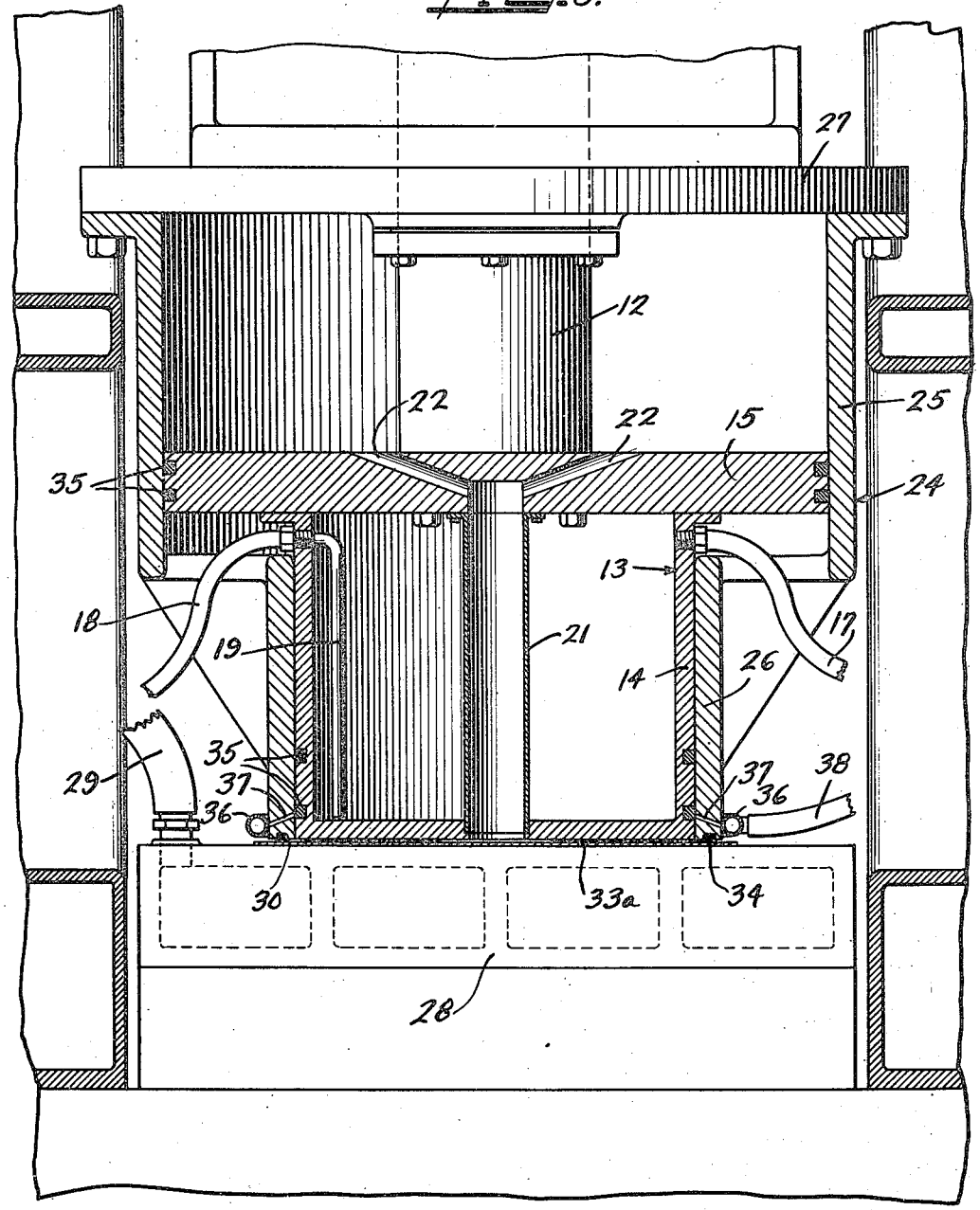
Figure 5 is a view similar to Figure 4 but with the parts in their pressing position.

For convenience, the invention is described as applied to the production of blanks for plastic trim rings for use on automobile wheels, but it will be readily appreciated that the invention is applicable generally to the production of sheets from plastic material.

A suitable double-acting press 11 is provided having a main ram 12 actuating a hollow pressing piston 13. The piston 13 has a lower pressing portion 14 and an upper portion 15 of considerably greater diameter than the portion 14. The lower pressing portion 14 has a smooth, highly polished pressing face 16. A heating medium such as steam may be introduced into the hollow piston by means of a conduit 17, and a cooling medium such as water may be introduced into the piston through a conduit 18 which connects with a pipe 19 secured within the piston and extending to near the bottom thereof, which acts as an inlet and a discharge conduit for the cooling medium. The pressing face 16 of the piston 13 has an aperture 20 in the center thereof opening into a tube 21 which extends through the piston to communicate with bores 22 formed in the upper portion 15 of the piston, so that a passage for fluid such as air is provided through the piston 13.

The press 11 also has a plurality of secondary rams 23 which actuate a generally cylindrical member 24 in which the piston 13 may reciprocate. The cylindrical member 24 has coaxial upper and lower portions 25 and 26, respectively, the upper portion being of greater diameter than the lower portion. The upper portion 25 is closed at the top by a cover member 27 having an aperture through which the ram 12 passes. The inner diameter of the upper portion 25 corresponds to the diameter of the upper piston portion 15, and the inner diameter of the lower cylindrical portion 26 corresponds to the diameter of the lower piston portion 14. It will be seen that the upper portion 25 of the cylindrical member comprises a chamber closed by the cylindrical wall of the portion 25, the cover member 27 and the upper piston portion 15, and that the lower cylindrical portion 26 forms a cylindrical chamber open at one end and closed at the other end by the lower or pressing portion 14 of the piston 13. The length of the lower piston portion 14 is such that when the lower portion has reached its extreme pressing position the upper piston portion 15 is held clear of the cylindrical wall of the lower cylindrical portion 26, and when the piston is in its extreme retracted position the pressing face 16 is still within the lower cylindrical portion 26.

The press 11 has a bed 28 which is heated by a heating medium such as steam introduced into the bed through a conduit 29. The plastic material to be pressed into a sheet is brought into position on the heated bed 28 below the pressing face 16 of the piston 13 by means of an endless conveyor 30, which may be supported at intervals along its length by rollers 31 to prevent undue sagging thereof. The conveyor 30 passes through a furnace or other heating means represented diagrammatically at 32, disposed between the receiving end of the conveyor and the press 11, and also passes through the press 11, the upper leg of the conveyor passing over the heated bed 28 and the lower leg passing through the base of the press. The conveyor 30 has a highly polished outer surface, and for this and other reasons may be made of stainless steel. Plastic material in the form of a ring 33 is deposited on the conveyor 30 at its receiving end and is carried through the furnace 32, and during its travel therethrough is brought to proper forming temperature. The plastic material may be of any desired type, and, by way of example only, cellulose acetate, cellulose acetate butyrate, and ethyl cellulose are mentioned, but it will be understood that the invention is applicable to various other types of plastic material. The material may be in any desired form, such as powder, granular, or solid form, such as an extruded plastic rod. In general, a plastic rod is preferable since it may be handled more easily and speedily than the granular particles, and minimizes the possibility of air entrapment in the sheet.

From the furnace 32 the plastic ring 33 is carried by the conveyor into the press 11 and centered beneath the pressing face 16. As will be clear, the ring 33 rests on the conveyor 30 which in turn rests on the heated bed 28. The piston 13 is heated to a proper temperature by steam or other heating medium introduced through the conduit 17, and the rams 12 and 23 are operated to move the cylindrical member 24 and the hollow piston 13 toward the bed 28. As will be obvious, the lower edge of the lower piston portion 26 contacts the conveyor 30 and clamps it tightly against the bed 28, and thus the conveyor 30 provides a solid, level and highly polished pressing surface for the ring 33. The lower edge of the cylindrical portion 26 carries a ring 34 of resilient material which provides a substantially air-tight seal between the conveyor 30 and the lower cylindrical portion 26. Suitable sealing rings 35 are provided in the peripheries of the lower piston portion 14 and the upper piston portion 15 to provide substantially air-tight engagement between the piston portions and the corresponding portions of the cylindrical member 24. It will thus be seen that when the lower cylindrical portion 26 is held against the conveyor 30, two air-tight chambers are provided, one in the upper cylindrical portion as already described, and the other in the lower cylindrical portion 26 closed by the conveyor 30, the wall of the lower portion 26, and the pressing face 16 of the piston 13. Communication between the chambers is afforded by the passageway 21 and bores 22. After the lower portion 26 has engaged the conveyor 30, the ram 12 continues its movement to press the pressing face 16 of the piston 13 against the ring 33 to form the ring into a substantially circular disk 33a with an aperture at its center.

An important feature of this invention is that as the piston 13 moves toward the bed 28, air is forced from the lower closed chamber into the upper closed chamber, partly by the pressure exerted by the pressing face 16, but primarily by a suction effect due to the difference in the size of the upper and lower chambers as the piston 13 moves to its pressing position. Since the chambers are air-tight, the air expands to fill the upper chamber as its volume increases while that of the lower chamber decreases upon movement of the piston 13 to pressing position. This expansion of the air in the upper chamber produces a suction effect in the lower chamber which removes substantially all of the air in the lower chamber as the piston presses the ring 33. The pressing of the ring 33 into the sheet 33a is therefore accomplished in a rarefied atmosphere, which substantially prevents the formation of air bubbles in the plastic material, either within the body of the material or at the surface, and thus results in a sheet or blank which is perfect both in structure and appearance. The highly polished surfaces of the pressing face 16 and the conveyor 30 impart a smooth, polished surface to the sheet or blank 33a.

During the dwell of the pressing face 16 on the plastic material, the piston 13 is cooled, as by the introduction of water through the conduit 18 and the pipe 19 into the interior thereof, in order to reduce to a minimum the possibility of the sheet 33a sticking to the face 16 when the piston 13 is retracted. The water or other coolant is pumped out through the pipe 19 and conduit 18 as the piston 13 moves to its retracted position.

It will be obvious that the heating and cooling means for the piston 13 and the heating means for the bed 28 may be of any desired type, and need not take the particular form shown and described herein. It will also be obvious that the air passage between the chambers need not be positioned centrally of the piston, and furthermore that it need not pass through the piston.

To insure against the possibility of a sheet 33a adhering to the pressing face 16 of the piston despite the cooling of the piston, means are provided to remove any sheet which may adhere to the face 16 without marring the sheet. As shown, the means comprises a pipe or the like 36 secured about the lower cylindrical portion 26 near the bottom edge thereof and communicating with the interior of the portion 26 by means of passages 37 provided through the wall of the portion 26 at intervals therearound. A conduit 38 is connected to the pipe 36, and through this conduit fluid under pressure, such as compressed air, may be introduced into the lower portion 26 as a plurality of streams or blasts through the passages 37 and pipe 36. The passages 37 extend through the wall of the lower cylindrical portion 26 at an angle to direct the stream of compressed air or the like upwardly, and the compressed air or other fluid is introduced at the moment when the piston 13 in its retracting movement has reached a position slightly spaced from the conveyor 30, so that the streams of compressed air will impinge against the pressing face 16 at the edge of the sheet 33a. It will be clear that since the bed 28 is heated and the pressing face 16 is cooled during the dwell of the face 16 on the plastic material in the pressing operation, the sheet 33a will tend to adhere to the conveyor 30 rather than to the face 16; but in the event the sheet 33a does adhere to the face 16, it is removed by the blast of compressed air passing about the circumference of the sheet between the face 16 and the sheet 33a. It will be appreciated that the compressed air or the like has a double removing effect on the sheet 33a, since it tends to cool the sheet and thereby overcome or loosen its adhesion to the face 16, and at the same time the force of the blast peels the sheet from the face 16. The use of compressed air or other fluid has another advantage, in that the sheet may be removed without marring the surface thereof, which would not be the case were a knife or scraper used for this purpose.

As the piston 13 is retracted, the air in the upper chamber is forced into the lower chamber, and after the piston 13 has reached its fully retracted position in the cylindrical member 24 the cylindrical member 24 is also retracted with further retracting movement of the piston 13 to bring the pressing parts into substantially the position shown in Figure 1. It will be obvious that as the piston is retracted in the cylindrical member, the air will return to the lower closed chamber under normal pressure, and that therefore there will be no difficulty in breaking the seal between the lower cylindrical portion 26 and the conveyor 30.

As the piston 13 and cylindrical member 24 are brought to fully retracted position, the conveyor 30 is operated to carry the sheet 33a out of the press and bring another ring 33 into position for pressing. It will be obvious that the conveyor 30 is operated in synchronism with the operations of the press 11, and this synchronization may be obtained in any suitable manner. The air blast, of course, is also synchronized with the operation of the press, and this synchronization similarly may be obtained in any suitable manner.

As the sheets or blanks 33a leave the press, they may be carried to a forming die or the like to be given a desired cross-sectional contour, or to some other device or machine for another operation. It may therefore be desirable to maintain the sheet 33a at a suitable temperature, and for this purpose a suitable heating means is represented diagrammatically at 39 in Figure 2.

After leaving the conveyor 30, the sheet 33a may be suitably trimmed at its inner and outer peripheries to give the sheet a form similar to that illustrated in Figures 9 and 10, or the trimming may be postponed until after a further operation has been performed on the sheet 33a.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. In an apparatus for forming plastic material into sheets, in combination, a double-acting press, a conveyor carrying the plastic material into position in the press, and means in said press for holding a portion of said conveyor against the press bed and sealingly enclosing plastic material thereon, said means including a portion movable relative to the rest of said means for simultaneously pressing said material and means substantially exhausting air from said first mentioned means.

2. Apparatus for forming sheets from plastic material comprising a press, a first cylinder in said press open at both ends and movable to seal the bottom edge thereof against the press bed, a second cylinder of larger diameter than said first cylinder disposed above and secured to said first cylinder, a pressing plunger reciprocable in said cylinders having a lower piston portion in said first cylinder and an upper piston portion in said second cylinder, conduit means to permit passage of air from one cylinder to the other, and means to direct a fluid stream upwardly against the plunger face.

3. An apparatus for forming plastic material into sheets comprising a double-acting press with a heated bed, an endless conveyor passing through said press to carry plastic material to be sheeted, chamber means in said press having two portions of different cross-sectional area, said means being movable to press the smaller portion against a portion of said conveyor to hold said conveyor portion tightly against said bed, a piston with portions closely fitting and movable in said portions of said chamber means and forming chambers therewith of different areas, a passageway through said piston connecting said chambers, said piston portion in the smaller chamber pressing upon plastic material carried by the conveyor to form a sheet of said material.

4. An apparatus for forming plastic material into sheets comprising a double-acting press with a heated bed, a plastic material conveyor passing over said bed, chamber means in said press having a lower portion and an upper portion of greater cross-sectional area than said lower portion, said chamber means being movable to clamp said conveyor between the bottom edge of said lower portion and said bed, a hollow double-faced piston movable in said chamber means, the lower face of said piston constituting a pressing face snugly fitting in the lower portion of said chamber means and forming a lower chamber therewith and with said conveyor and the upper face of said piston snugly fitting in the upper portion of the chamber means and forming a chamber therewith, a passage through said piston connecting said chambers, heating means for said piston, and cooling means for the piston.

5. In a double-acting press for plastic material, a heated bed, a piston to press plastic material on said bed, a flange on the upper portion of the piston, means for heating and means for cooling said piston, a chamber element comprising an upper-walled portion snugly receiving said flange and a lower-walled portion forming a cylinder for said piston, said chamber element being movable to engage the bottom edge of said lower portion against said bed and about the plastic material, a passage through said piston and flange to permit escape of air from said lower chamber element portion to said upper portion upon downward movement of said piston and flange in said lower portion and upper portion respectively, and means to direct a fluid stream against the face of the piston.

6. In an apparatus for forming sheets from plastic material comprising a furnace and a conveyor passing through said furnace and carrying plastic material, a press comprising a bed over which said conveyor passes, a cylindrical member open at its lower end and having an upper portion and a lower portion of smaller diameter than said upper portion, a pressing piston reciprocable in said lower portion and having an upper end of a diameter corresponding to that of said upper cylindrical portion and reciprocable therein, said upper piston end and upper cylinder portion forming an upper chamber and said piston and lower cylindrical portion forming a lower chamber, said cylindrical member being movable to enclose the plastic material in said lower chamber, and a passageway through said piston and upper piston end communicating with said chamber.

7. In an apparatus for pressing plastic material into sheets including a furnace and a conveyor carrying plastic material through said furnace, a press comprising a bed supporting a portion of said conveyor, a cylindrical member having sections of different diameters, piston means having portions fitting in said sections, said piston means being reciprocable in said cylindrical member to increase the effective volume of the larger diameter section to more than the maximum volume of the other section and to press plastic material in the smaller diameter section, and air passage means connecting said sections.

8. A method of forming plastic material into sheets comprising conveying the material through a furnace to heat said material, placing the heated material on a heated press bed, sealing said material from outside atmosphere, substantially exhausting air from about said material, pressing said material between said bed and a heated press element, holding said material under pressure, cooling said heated press element, releasing said pressure, and blowing air against the bottom of said press element and inwardly toward the edge of the pressed plastic sheet and between said edge and the press element to remove therefrom the sheet formed of said plastic material.

9. In an apparatus of the class described, an intermittently moving endless belt having a highly polished surface carrying spaced masses of plastic material to be formed into sheets, means defining an area through which said belt passes for conditioning said plastic material, a substantially flat supporting surface over which said belt passes after passing through said conditioning area, means movable toward and away from said belt and adapted for holding a portion of said belt tightly against said surface, and a pressing element movable relative to said holding means and having a highly polished pressing surface for pressing a mass of material on the held portion of the belt against the resistance of said supporting surface and between said polished surfaces to impart a sheet form and smooth surfaces thereto.

10. Apparatus for forming plastic material into sheets comprising, in combination, means for heating said material, means defining a first closed area of variable capacity within which the material is received and a second closed area of greater cross sectional area than that of said first area and of inversely variable capacity communicating with said first area, said means including a movable structure operable for contracting said first area to contemporaneously displace air therefrom into said second area to expand in said second area whereby to rarefy the air in both of said areas.

11. Apparatus for forming plastic material into sheets, comprising means defining a first variable closed chamber and a second variable closed chamber of greater cross sectional area than that of said first chamber and of greater maximum capacity communicating with said first chamber, and mechanism for contemporaneously expanding said second chamber and contracting said first chamber, said means including a pressing surface operable in said first chamber to press said material during rarefication of the atmosphere.

12. Apparatus for shaping plastic material comprising, in combination, means defining a first variable closed chamber and a communicating second variable closed chamber of greater cross sectional area than that of said first chamber and spaced from the first chamber by a movable pressing member forming a separating wall therebetween, and means for moving said pressing member to shape the material and contemporaneously extract substantially all of the air from said first chamber by expanding said second chamber to a volume greater than the maximum volume of said first chamber while contracting said first chamber.

13. Apparatus for forming plastic material into sheets comprising, in combination, a forming station, means for heating said material, means for feeding said material progressively by predetermined individual units to the forming station, means at said station defining a first closed area of variable capacity within which the successive units of material are adapted to be sealed and a second closed area of greater cross-sectional area than that of said first area and of inversely variable capacity communicating with the first area, said area-defining means including a movable structure operable to contract said first area to contemporaneously force air therefrom into said second area and expand said second area to rarefy the air in both of said areas and press the material, and means for operating said feeding means in timed sequence with said area-defining and pressing means.

14. In combination in apparatus for pressing plastic material into thin sheet form, means providing a smooth pressing base to receive plastic material to be pressed thereagainst, a tubular structure movable axially into and out of sealed closing relation to said pressing base, a piston structure guided for axial movement within said tubular structure and operable in sequential relation thereto for pressing the material against said base and having a smooth pressing face opposing said base, means for rarefying the atmosphere within said tubular structure between said base and said pressing face during the pressing operation, said tubular structure having a uniform series of pressure fluid ports directed inwardly from the inner wall thereof, and means operable when the piston structure is retracted from said pressing base to force pressure fluid through said ports and between said pressing face of the piston structure and the sheet of pressed plastic material whereby to break any vacuum seal existing between the sheet and said face and strip the sheet therefrom.

15. In combination in apparatus for pressing flat plastic sheets of ring form from ring shaped rods of plastic material, means providing a smooth pressing base for supporting a plastic ring rod to be pressed, a cylindrical tubular structure cooperable with said base to sealingly enclose the area occupied by said ring of material to be pressed, a piston structure slidably guided within said tubular structure and having a pressing face opposed to said base for pressing the rod ring therebetween into a ring shaped sheet, said pressing face having a central opening therein, and means for substantially evacuating the atmosphere between said base and face through said opening substantially coincident with the pressing operation.

16. The method of making ring shaped blanks of thin sheet plastic material, comprising subjecting individual ring shaped rods of the plastic material to heat and pressure between opposed smooth flat pressing surfaces, and in the course of the pressing of each rod ring evacuating the air from the center of the ring to rarefy the atmosphere in the pressing zone and avoid entrapment of air in the finished sheet ring blank.

17. In combination in apparatus for pressing flat plastic sheets of ring form from ring shaped plastic material, means comprising a first smooth pressing platen for supporting a plastic ring to be pressed, a tubular structure cooperable with said first platen to sealingly enclose the area occupied by said ring of material to be pressed, a piston structure slidably guided within said tubular structure and having a second pressing platen opposed to said first platen for pressing the plastic ring therebetween into a flat ring-shaped sheet, at least one of said platens having a central opening therein, and means for substantially evacuating the atmosphere between said platens through said opening contemporaneously with the pressing operation.

GEORGE ALBERT LYON.

REFERENCES CITED

The following references are of record in the file of this patent:

UNITED STATES PATENTS

| Number | Name | Date |
|---|---|---|
| 356,879 | Lister | Feb. 1, 1887 |
| 511,751 | Britton | Jan. 2, 1894 |
| 1,657,227 | Owen | Jan. 24, 1928 |
| 1,706,874 | De Journo | Mar. 26, 1929 |
| 1,754,502 | Denmire | Apr. 15, 1930 |
| 1,793,089 | Heyes | Feb. 17, 1931 |
| 2,027,165 | Grubman | Jan. 7, 1936 |
| 2,120,328 | Ferngren | June 14, 1938 |
| 2,159,779 | Cavin | May 23, 1939 |
| 2,272,009 | Keller et al. | Feb. 3, 1942 |
| 2,350,175 | Luxenberger | May 30, 1944 |

FOREIGN PATENTS

| Number | Country | Date |
|---|---|---|
| 508,598 | Great Britain | July 4, 1939 |
| 737,827 | France | Oct. 10, 1932 |